Oct. 15, 1963
V. R. SAVAGE
3,106,793
BULLDOZER BLADE STRUCTURE
Filed March 19, 1962
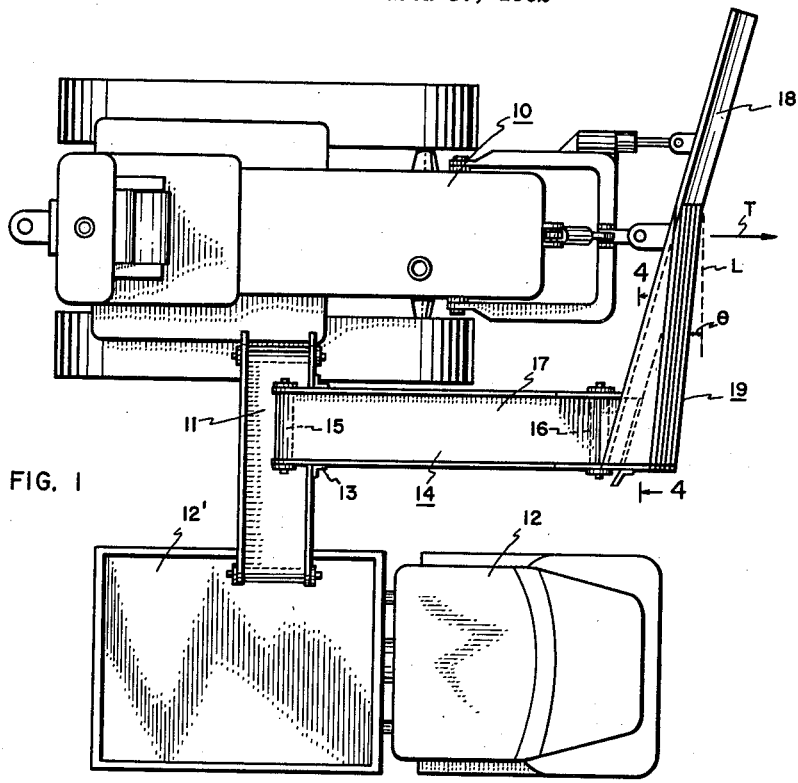
FIG. 1
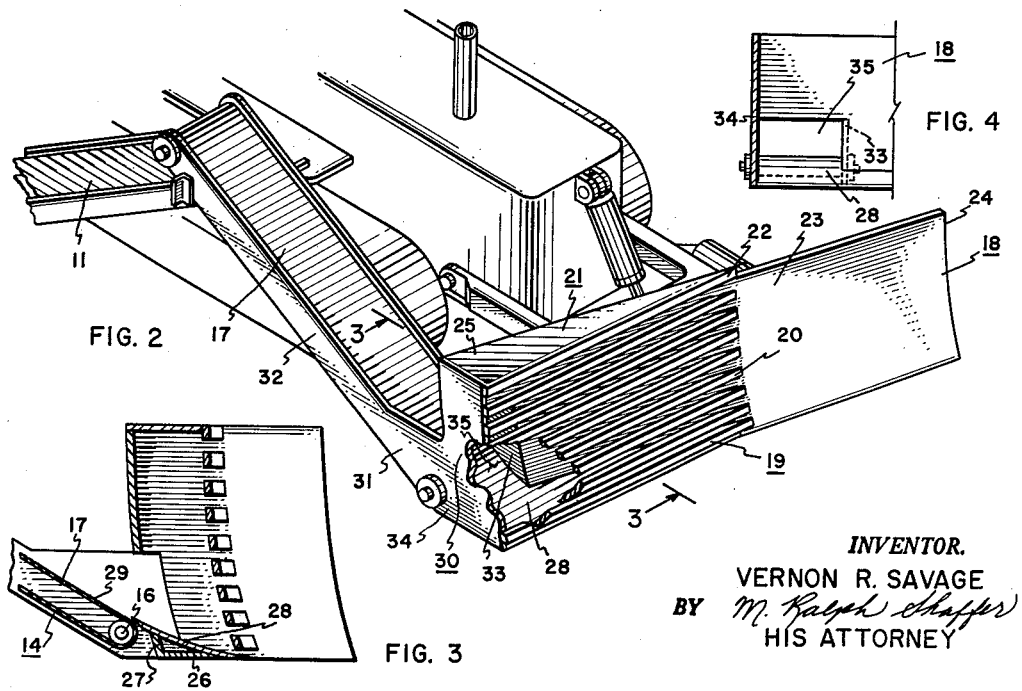
FIG. 2
FIG. 3
FIG. 4
INVENTOR.
VERNON R. SAVAGE
BY M. Ralph Shaffer
HIS ATTORNEY United States Patent Office 3,106,793
Patented Oct. 15, 1963

3,106,793
BULLDOZER BLADE STRUCTURE
Vernon R. Savage, 3113 W. 11400 South, Riverton, Utah
Filed Mar. 19, 1962, Ser. No. 180,496
3 Claims. (Cl. 37—143)

The present invention relates to bulldozer blade structure for earth moving equipment and, more particularly, to a new and improved structure of the type described wherein there may be accomplished a separation of fine grain earth materials such as sand, gravel and dirt from coarse grain materials such as large rocks so that the former may easily be conveyed, received and transported from the working area whereas the latter may be deposited along the edge of the roadway or other area being worked, and this in an automatic and highly efficient manner.

Accordingly, the object of the present invention is to provide a new and improved blade structure for earth working machinery.

Another object of the present invention is to provide a bulldozer blade structure which, by virtue of its novel, angulated grate means and conveyor means associated therewith, is enabled to accomplish, simultaneously, the earth working of a desired area and the separation of coarse and fine materials resulting therefrom so that the former may be deposited at the side of a roadway, for example, whereas the latter may be conveyed from the working area.

An additional object of the present invention is to provide composite blade, grate, and conveyor means in a bulldozer blade construction, either of an integral or an attachment type, wherein earth working and earth materials separation is automatically accomplished so that the fine materials particularly adapted for conveyor belt travel may be separated from coarser materials and be conveyed away from the working area as desired.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a plan view of a tractor incorporating the bulldozer blade and conveyor structure of the present invention; a dump truck is also shown and is in position to receive fine grain materials passing through the blade structure and conveyed therefrom to the dump truck by plural conveyor belt means.

FIGURE 2 is a fragmentary, isometric view of the structure of FIGURE 1 looking down from the front and right side thereof.

FIGURE 3 is a slightly enlarged, sectional view taken along the line 3—3 in FIGURE 2.

FIGURE 4 is a slightly enlarged, fragmentary, partially sectioned view taken along the line 4—4 in FIGURE 1.

In FIGURE 1 is illustrated a tractor 10 having a laterally disposed, transversally extending conveyor belt means 11 of standard construction. The conveyor belt means 11 is supported in a substantially horizontal position from and by the tractor 10 by means of welds, suitable attachments, or other means. The conveyor means 11 is provided for the purpose of conveying earth and other matter received thereby to the bed 12′ of a transport truck 12 which upon receiving a sufficient load from conveyor means 11, may be driven to a dump or other area.

Preferably affixed either to the tractor 10 or to the conveyor means 11 is a frame structure 13 which forms an integral part of conveyor belt means 14, the latter being provided with journaled rollers 15 and 16 and with the conventional conveyor belt 17.

It is obvious that the frame structure 13 of conveyor belt means 14 may be attached to and completely supported by the tractor 10, or the forward extremity of conveyor belt means 14 may be fixedly deposed as by welding, attachments, or by other means to the bulldozer blade 18, the latter being mounted to tractor 10 in a conventional manner.

A grate structure 19 preferably comprises a plurality of horizontally disposed, vertically spaced, elongate bars 20 and support structure 21 which fixedly secures grate 19 to blade 18.

As is to be noted in connection with FIGURE 2, the grate structure 19 is angularly disposed with respect to blade 18 so that the left extremity 22 (looking from the driver's seat of the tractor) is proximate blade 18 and can be disposed either at a medial region 23 of blade 18 or, conceivably, at or near the extremity 24 of blade 18.

In the integral, unitary construction, as indicated, the support structure 21 may include top panel 25, bottom panel 26, support riser 27, and an inclined floor panel 28 across which earth material will travel so as to be deposited upon the upper surface 29 of conveyor belt 17.

The support structure likewise preferably includes an end panel 30 which may optionally include a baffle portion 31, baffle extension 32, and the end plate portion 34. The extension 32, baffle portion 31, and end plate portion 34 will be for the purpose of assuring the conveyance of earth materials by conveyor belt 17 in an upward direction, thus precluding the spilling of earth materials off and/or from the right extremity, with reference to the driver, of the blade structure.

Panel 33 completes the support structure 21 and, with the outer, end plate portion 34, defines a passageway 35 through which the floor plate 28 protrudes and through which earth materials will travel to conveyor belt 17. At this point it should be mentioned that while the structure shown is integral with the blade 18, the invention also comprehends the situation where the grate and support structures (19, 21 and 30) are made simply attachable to a conventional blade 18. In this event the passageway 35 will simply be defined by the right end of the blade 18 and end panel 30, of support structure 21, spaced therefrom. Where the grate structure 19 is integral with the blade 18, then the left ends of grate bars 20 may be welded or otherwise secured to blade 18.

The structure shown in the drawing operates as follows: Bulldozer 10, or other earth moving equipment provided with the composite blade structure 18, 19 and 21, will proceed in a forward direction to accomplish the intended, earth-working function desired. As the blade 18 proceeds forwardly, loose earth material such as rocks, sand, gravel and other materials will be urged forwardly by the blade 18 and, since the latter is angulated rearwardly to the right (see FIGURE 1), will progress along the blade from left to right until such materials arrive at the grate area delineated by grate structure 19. At this point dirt and other fine grain materials will filter through the several grate bars 20 to continue to progress along blade 18 until such materials arrive at opening 35. The forward progression of the earth-working equipment will cause the earth materials to proceed up floor panel 28 for deposit onto conveyor belt 17. Such fine materials are carried up the conveyor belt 17 and ride over the rearward end thereon for deposit onto lateral conveyor means 11, for ultimate deposit into the bed 12′ of truck 12.

Coarse grain materials such as rocks which are unsuited to such conveyance by conveyor belt 17, or which for other reasons are desired to be deposited along the edge of the roadway or other area being worked, will not pass through the grate bars 20 of grate structure 19 but rather will proceed therealong in a sliding manner so as to be deposited along the edge of the roadway to the right of end panel 30.

It will be noted that, for the purposes of the structure as hereinbefore explained, the blade 18 should be oriented so that at least a slight angle $\theta$ will always exist between the transverse line L (perpendicular to the direction of travel T) and the grate structure 19 for, in this event, rocks and other coarse materials may easily be deposited to the side of the earth-working equipment without chance of undesired buildup.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. Bulldozer blade structure including, in combination, an upstanding, horizontally elongated blade, an upstanding grate angularly disposed in front of and fixedly disposed with respect to said blade, support structure affixed to said blade and to said grate, the composite structure of said blade, grate, and support structure being provided with a passageway rearward of said grate and leading rearwardly from said blade, the extremity of said grate remote from said passageway being proximate said blade, said support structure including a rearwardly inclined floor panel disposed at the bottom of said composite structure and disposed at a lower region of said passageway, and conveyor means fixedly disposed rearwardly of said composite structure, communicating with said passageway and disposed at its forward extremity beneath the rear extremity of said floor panel, for receiving earth materials passing through said grate and passageway and for conveying the same away from said composite structure.

2. Structure according to claim 1 wherein said conveyor means includes at least a pair of fixedly spaced conveyor roller means and an endless conveyor belt disposed thereabout and extending therebetween, the forward one of said rollers being disposed beneath said floor panel.

3. Bulldozer blade structure including, in combination, an upstanding, horizontally elongated blade, an upstanding grate angularly disposed in front of and fixedly disposed with respect to said blade, support structure affixed to said blade and to said grate, the composite structure of said blade, grate, and support structure being provided with a passageway rearward of said grate and leading rearwardly from said blade, the extremity of said grate remote from said passageway being proximate said blade, said support structure including a floor panel disposed at the bottom of said composite structure and disposed at a lower region of said passageway, and conveyor means fixedly disposed rearwardly of said composite structure, communicating with said passageway and disposed at its forward extremity beneath the rear extremity of said floor panel, for receiving earth materials passing through said grate and passageway and for conveying the same away from said composite structure.

References Cited in the file of this patent

UNITED STATES PATENTS

| | | |
|---|---|---|
| 1,241,880 | Penington | Oct. 2, 1917 |
| 1,440,232 | Muir | Dec. 26, 1922 |
| 1,736,352 | Mahoney et al. | Nov. 19, 1929 |